US012782167B2

(12) United States Patent
Landman

(10) Patent No.: US 12,782,167 B2
(45) Date of Patent: Nov. 3, 2026

(54) SENSOR AND SENSING METHOD

(71) Applicants: Werner Landman, Pretoria (ZA); Adrian Landman, Pretoria (ZA)

(72) Inventor: Adrian Landman, Pretoria (ZA)

(73) Assignee: Adrian Landman, Pretoria (ZA)

( * ) Notice: Subject to any disclaimer, the term of this patent is extended or adjusted under 35 U.S.C. 154(b) by 0 days.

(21) Appl. No.: 18/707,004

(22) PCT Filed: Nov. 1, 2022

(86) PCT No.: PCT/IB2022/060508
§ 371 (c)(1),
(2) Date: May 2, 2024

(87) PCT Pub. No.: WO2023/079435
PCT Pub. Date: May 11, 2023

(65) Prior Publication Data

US 2026/0016321 A1 Jan. 15, 2026

(30) Foreign Application Priority Data

Nov. 2, 2021 (ZA) ................................ 2021/08462

(51) Int. Cl.
*G01D 5/20* (2006.01)

(52) U.S. Cl.
CPC .................................... *G01D 5/20* (2013.01)

(58) Field of Classification Search
None
See application file for complete search history.

(56) References Cited

U.S. PATENT DOCUMENTS

| | | | | |
|---|---|---|---|---|
| 4,805,466 | A | 2/1989 | Schiessle et al. | |
| 8,461,829 | B2 * | 6/2013 | Steinich | G01D 11/245 324/207.2 |
| 9,329,019 | B2 * | 5/2016 | Reymann | G21C 7/10 |
| 10,760,927 | B2 * | 9/2020 | Buck | G01D 5/147 |

FOREIGN PATENT DOCUMENTS

| | | | |
|---|---|---|---|
| WO | 02059555 | A1 | 8/2002 |
| WO | 2007025720 | A1 | 3/2007 |
| WO | 2017199063 | A1 | 11/2017 |

OTHER PUBLICATIONS

International Search Report for PCT/IB2022/060508 dated Feb. 17, 2023, 5 pages.
Written Opinion of the International Searching Authority for PCT/IB2022/060508 dated Feb. 17, 2023, 6 pages.

* cited by examiner

*Primary Examiner* — Farhana A Hoque
(74) *Attorney, Agent, or Firm* — Sheppard, Mullin, Richter & Hampton LLP; Xin Xie

(57) ABSTRACT

This invention relates to a sensor (1) and more specifically, but not exclusively, to a motion sensor for sensing a position of a first moving part of a device relative to a second part of the device. The invention discloses a sensor (1) comprising a stationary magnetic field generator (2) for generating a stationary magnetic field, and a moveable magnetically conductive part (3), moveable to influence the stationary magnetic field, a difference in influence being indicative of the position of the magnetically conductive part (3).

15 Claims, 4 Drawing Sheets

SENSOR AND SENSING METHOD

CROSS REFERENCE TO RELATED APPLICATIONS

This application is a U.S. National Stage Application of International Application No. PCT/IB2022/060508, filed on Nov. 1, 2022, which claims the benefit under 35 U.S.C. § 119 (e) of South African Provisional Application No. 2021/08462, filed Nov. 2, 2021, the contents of each of which are hereby incorporated by reference in their entirety.

FIELD OF THE INVENTION

This invention relates to a sensor and more specifically, but not exclusively, to a motion sensor for sensing a position of a first moving part of a device relative to a second part of the device.

BACKGROUND TO THE INVENTION

A motion sensor ("an encoder") detects rotation and/or linear displacement of a first part, for example, an axis, of a device relative to a second part, for example, a body, of the device. A rotary encoder detects rotation, and a linear encoder detects linear displacement.

A rotary encoder detects the angle of rotation, rotational speed, rotational direction, and rotational position of an axis. Rotary encoders include mechanical, optical, magnetic, capacitive, and inductive encoders.

A magnetic encoder has a rotor and a sensor. The rotor is secured to an axis and rotates with the axis. The rotor is a series of magnets and contains alternating, evenly spaced apart north and south poles around its circumference. As the axis, with the rotor secured thereto, rotates, the sensor detects changes in the positions of the north and south poles of the rotor. A magnetic encoder may have multiple north and south poles evenly spaced around the circumference of an axle. A magnetic encoder may alternatively have a magnet with only one north pole and one south pole.

U.S. Pat. No. 6,857,782B2, entitled "Magnetic encoder and wheel bearing assembly using the same", filed in the name of Takayuki Norimatsu and assigned to NTN Corp discloses a magnetic encoder in which an air gap between it and a magnetic sensor can be increased. The magnetic force generated thereby can easily be quality-controlled. A wheel bearing assembly has the magnetic encoder. The magnetic encoder includes a metal core and an elastic member, which is integrated with the metal core in a ring-shaped configuration. The elastic member is made from an elastic material mixed with a powder of magnetic material and has a plurality of different magnetic poles alternating in a direction circumferentially thereof. The elastic member also has a shore hardness of not lower than Hs 90. A wheel bearing assembly is also provided, which makes use of the magnetic encoder as a component part of a sealing unit.

United States patent application number US20110101964A1, entitled "Magnetic Encoder Element for Position Measurement", and assigned to Infineon Technologies AG discloses a magnetic encoder element for use in a position measurement system including a magnetic field sensor for measuring position along a first direction. The encoder element includes at least one first track that includes a material providing a magnetic pattern along the first direction, the magnetic pattern being formed by a remanent magnetization vector that has a variable magnitude dependent on a position along the first direction. The gradient of the remanent magnetization vector is such that a resulting magnetic field in a corridor above the first track and at a predefined distance above the plane includes a field component perpendicular to the first direction that does not change its sign along the first direction.

United States patent application number US20140116132A1, entitled "Device for measuring angle and angular velocity of distance and speed", filed in the name of Heinrich Acker and assigned to Continental Teves AG, discloses a device for measuring angle and angular velocity or distance and speed of a moving part. The device has a sensor which is or can be arranged in a stationary manner and an encoder which is or can be arranged on the moving part and, together with the sensor, generates a modulation signal to be demodulated by the sensor. For the frequency measurement which is needed to measure the angular velocity/speed, the encoder has a structure which reproduces a periodic pattern and is interrupted by at least one index area for the angle/distance measurement. In the index area, the encoder has a substitute pattern which differs from the periodic pattern by at least one physical variable which can be detected by the sensor but has a structure which also enables the frequency measurement in the index area.

U.S. Pat. No. 5,302,893A, entitled "Magnetic encoder having a magnetic recording medium containing barium-ferrite", filed in the name of Kuniaki Yoshimura and assigned to Hitachi Metals Ltd discloses a coated magnetic recording member for use in a magnetic encoder that includes a non-magnetic substrate and a magnetic recording medium carried on the non-magnetic substrate. The magnetic recording medium of a magnetic film formed of a magnetic coating material which contains magnetic barium-ferrite powder. A magnetic encoder includes the magnetic recording member on which magnetic recording is conducted, and a magnetic sensor disposed in opposed relation to the magnetic recording medium.

U.S. Pat. No. 10,876,861 B2, entitled "Inductive Position Detector", filed in the name of Mark Anthony Howard and Darran Kreit and assigned to Zettlex (UK) Limited discloses an inductive detector provided for measuring the relative position of bodies along a measurement path. The detector includes an inductive target arranged along the measurement path; a laminar antenna arranged facing a portion of the target; an electronics circuit arranged along the measurement path; wherein, the inductance of at least one winding in the antenna varies continuously in proportion to the relative position of target and antenna.

Celera Motion discloses Zettlex inductive encoders (https://www.celeramotion.com/zettlex/) which use non-contact, inductive technology. Instead of transformers of traditional inductive sensors, Zettlex encoders use printed circuits. The encoders have two main parts each shaped like a flat ring: a stator and a rotor. The stator is powered and measures the angular position of the passive rotor. Larger encoders house all associated electronics within the stator whereas for smaller encoders, these electronics are distributed across the stator and a separate remote electronics board found in the cable assembly. A big bore and low axial height allow easy integration with through-shafts, sliprings, direct drive motors, optical-fibres, pipes or cables.

One of the difficulties of a polarised magnet is that the magnet cannot be polarised accurately. The exact position or angle of the shaft to which the polarised magnet is attached, cannot be measured accurately.

OBJECT OF THE INVENTION

It is an object of this invention to provide a sensor which, at least partially, alleviates the above-mentioned difficulty.

SUMMARY OF THE INVENTION

In accordance with this invention there is provided a sensor comprising a stationary magnetic field generator for generating a stationary magnetic field, and a moveable magnetically conductive part, moveable to influence the stationary magnetic field, a difference in influence being indicative of the position of the magnetically conductive part.

There is provided for the stationary magnetic field generator to be an electromagnet and/or a magnet.

There is provided for the electromagnet and/or magnet to be secured to a Printed Circuit Board ("PCB").

There is further provided for the electromagnet to have a power source.

There is provided for the electromagnet to be part of an oscillator.

There is provided for the electromagnet and/or magnet to cause an oscillation frequency suitable for adaptation and measurement with a micro-processor.

There is provided for the magnetically conductive part to be associated with a first part of an object, the position of which is to be detected.

There is provided for the first part to move relative to a second part of the object.

There is provided for the first part to be an axle.

There is further provided for the magnetically conductive part to locate around at least part of the axle.

There is further provided for the moveable magnetically conductive part to be a magnetically conductive ring that locates around the axis.

There is provided for the moveable magnetically conductive ring to be off-centre with the axis.

There is further provided for part of the surface of the moveable magnetically conductive ring to be sloped and/or irregular.

There is further provided for a major side surface of the moveable magnetically conductive ring to be sloped.

There is provided for the moveable magnetically conductive ring to be wedge-shaped in side view.

There is further provided for the moveable magnetically conductive ring to be composed of ferrite.

There is further provided for the magnet and/or electromagnet to be spaced apart from at least one side of the ferrite ring.

There is provided for the Printed Circuit Board to locate around at least part of the axis.

A sensing method comprising the steps of:

A stationary magnetic field generator creating a stationary magnetic field;

a moveable magnetically conductive part influencing the stationary magnetic field;

a sensor detecting a difference in influence on the stationary magnetic field.

A sensing method comprising the steps of:

A stationary field coil creating a Magneto Motive Force;

a stationary magnetically conductive part with low reluctance a moveable magnetically conductive part with low reluctance an air gap with high reluctance connecting the stationary magnetically conductive part and moveable magnetically conductive part, thus creating a magnetic path the moveable magnetically conductive part causing the air gap to vary, thus influencing the flow of magnetic flux;

a sensor detecting a difference in the flow of magnetic flux for a given Magneto Motive Force.

A further step of the invention provides for the moveable magnetically conductive part to move with a first part of an object, the position of which is to be detected.

A further step of the invention provides for the moveable magnetically conductive part to rotate off-centre around the first part.

A further step of the invention provides for the inductance of the stationary field coil to be detected.

These and other features of the invention are described in more detail below.

BRIEF DESCRIPTION OF THE DRAWINGS

Embodiments of the invention are described below, by way of example only, with reference to the drawings in which.

DETAILED DESCRIPTION OF THE DRAWINGS

Figure 1:
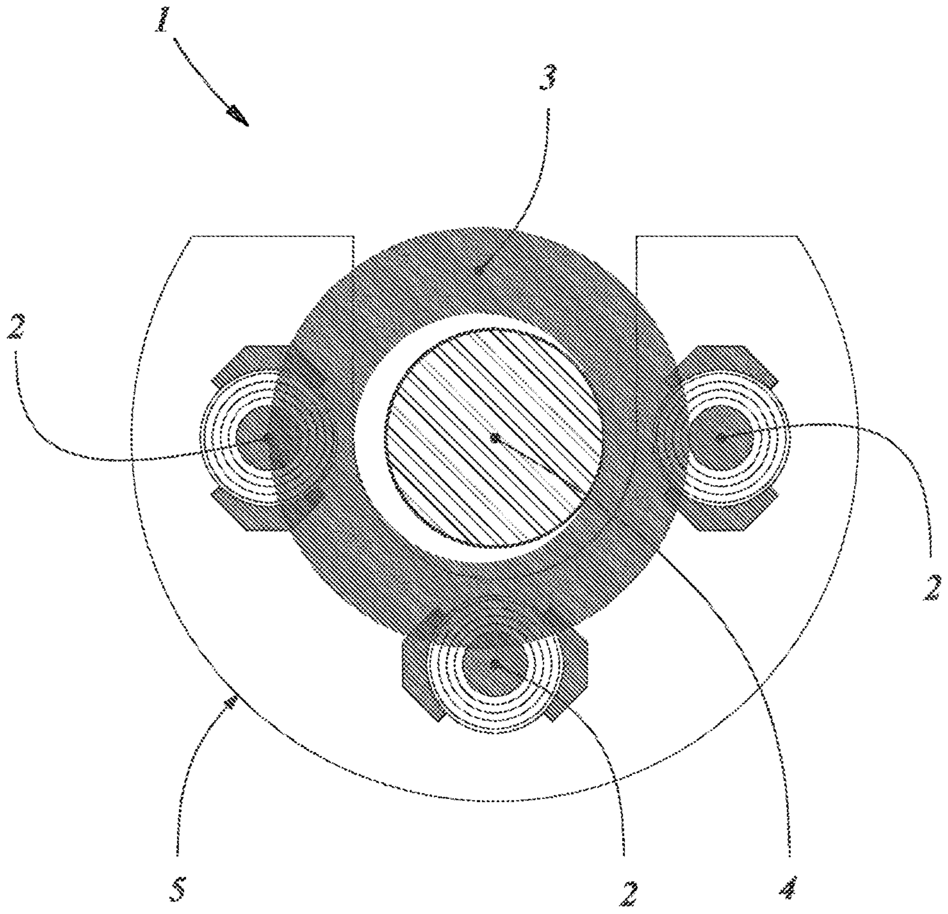
FIG. 1 shows a top view of a first embodiment of a sensor.
Figure 2:
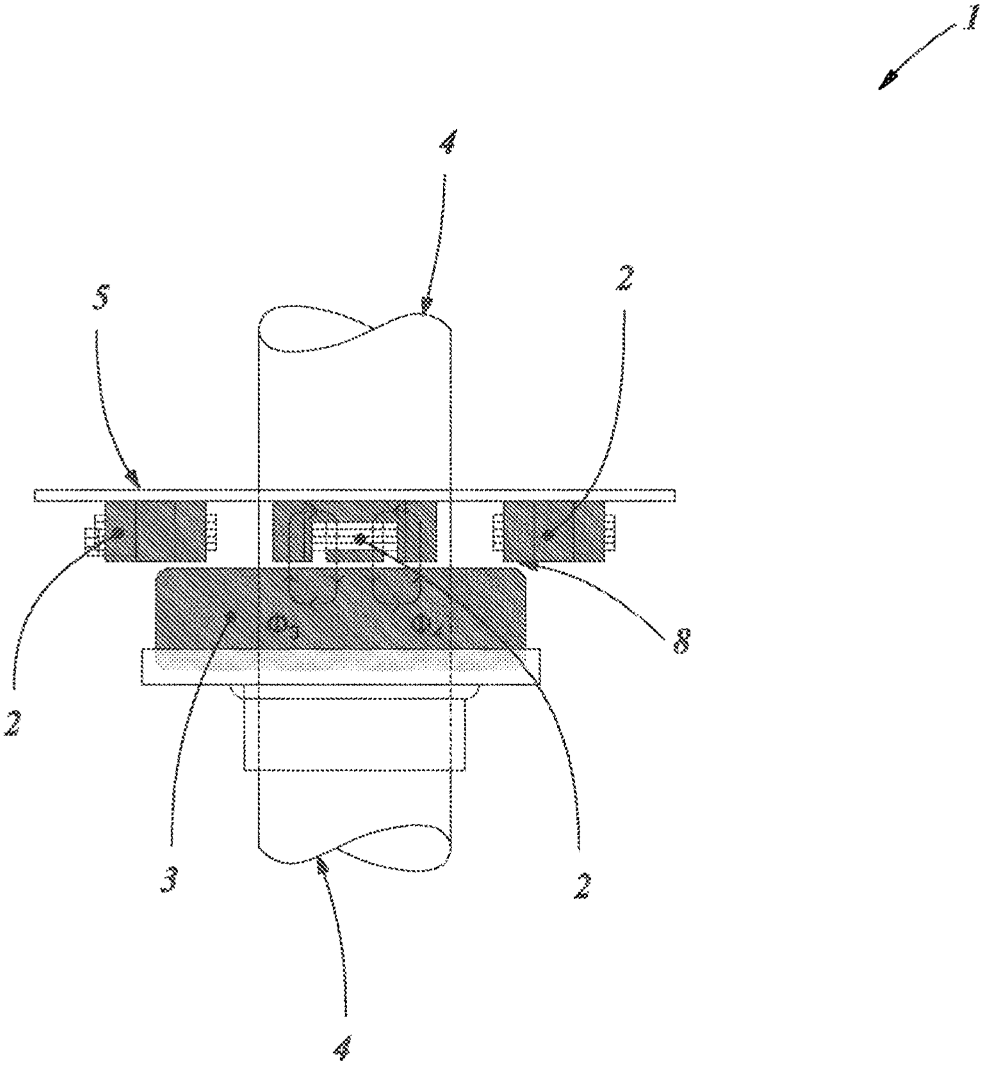
FIG. 2 shows a side view of the sensor of FIG. 1.

With reference to FIGS. 1 and 2, a sensor is generally indicated by reference numeral 1.

The sensor 1 has three stationary magnetic field generators 2. The stationary magnetic field generators 2 are, in this case field coils and, each forms part of an independent oscillator. The oscillators and associated field coils 2 are connected to a power source, for example, a battery (not shown). Each oscillator oscillates at a nominal frequency of 5 MHz determined by a tank circuit formed by a fixed capacitor and the field coil, the inductance of which varies with rotation of the axle. The capacitor is a standard surface mount device with fixed capacitance while the variable inductor is established by the windings of the field coil in conjunction with associated variable magnetic flux path.

The oscillators and associated field coils 2 are secured to a Printed Circuit Board ("PCB") 5. The PCB 5 is generally C-shaped in top view to allow for easy installation around an axle. The field coils are evenly spaced apart, at 90-degree intervals, around the inner edge of the PCB 5.

A magnetically conductive part 3 is spaced apart from upper surfaces of the field coils 2 to form an air gap 8 between the upper surfaces of the field coils and a lower surface of the magnetically conductive part 3. Part of the magnetically conductive part 3 locates over parts of the field coils 2. The magnetically conductive part 3 is a ferrite ring, avoiding Eddy Current losses.

The ferrite ring 3 is secured off-centre to an axis 4.

The axis 4 extends through the centre of the PCB 5.

Each oscillator and associated field coil 2 is buffered with a voltage comparator which produces a high-speed digital signal for transmission to a 32 bit binary counter in a common micro-processor (not shown).

Figure 3:
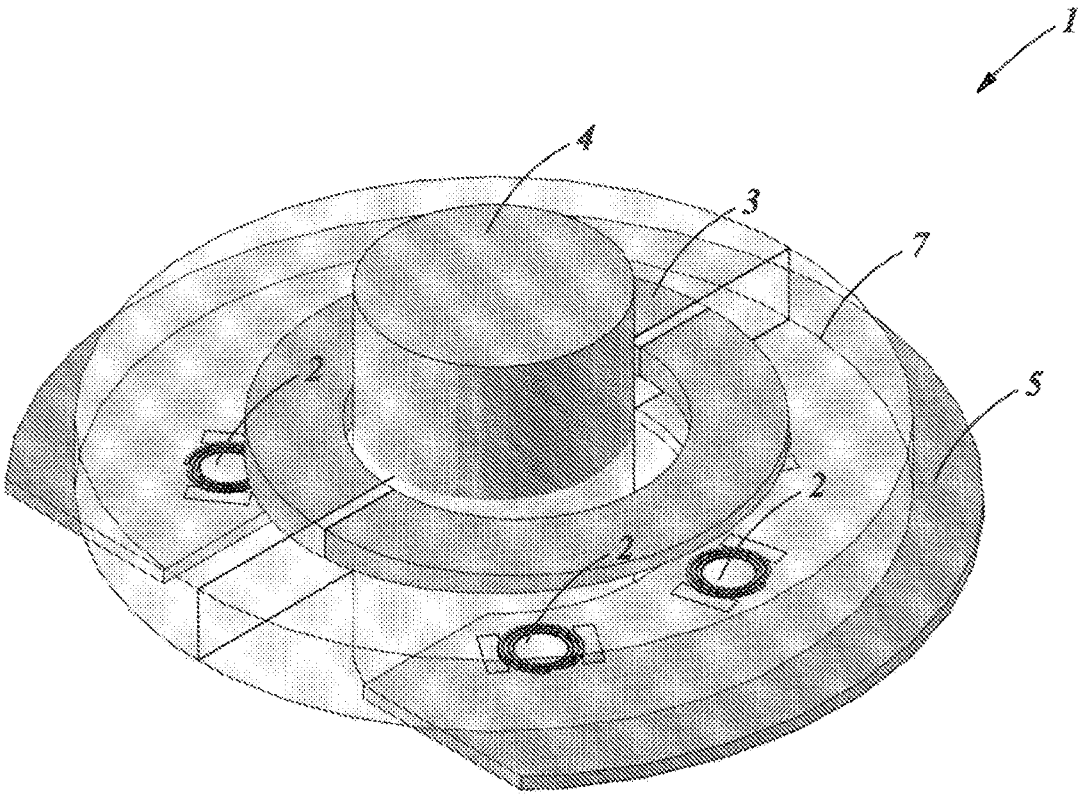
FIG. 3 shows a top perspective view of a second embodiment of a sensor.
Figure 4:
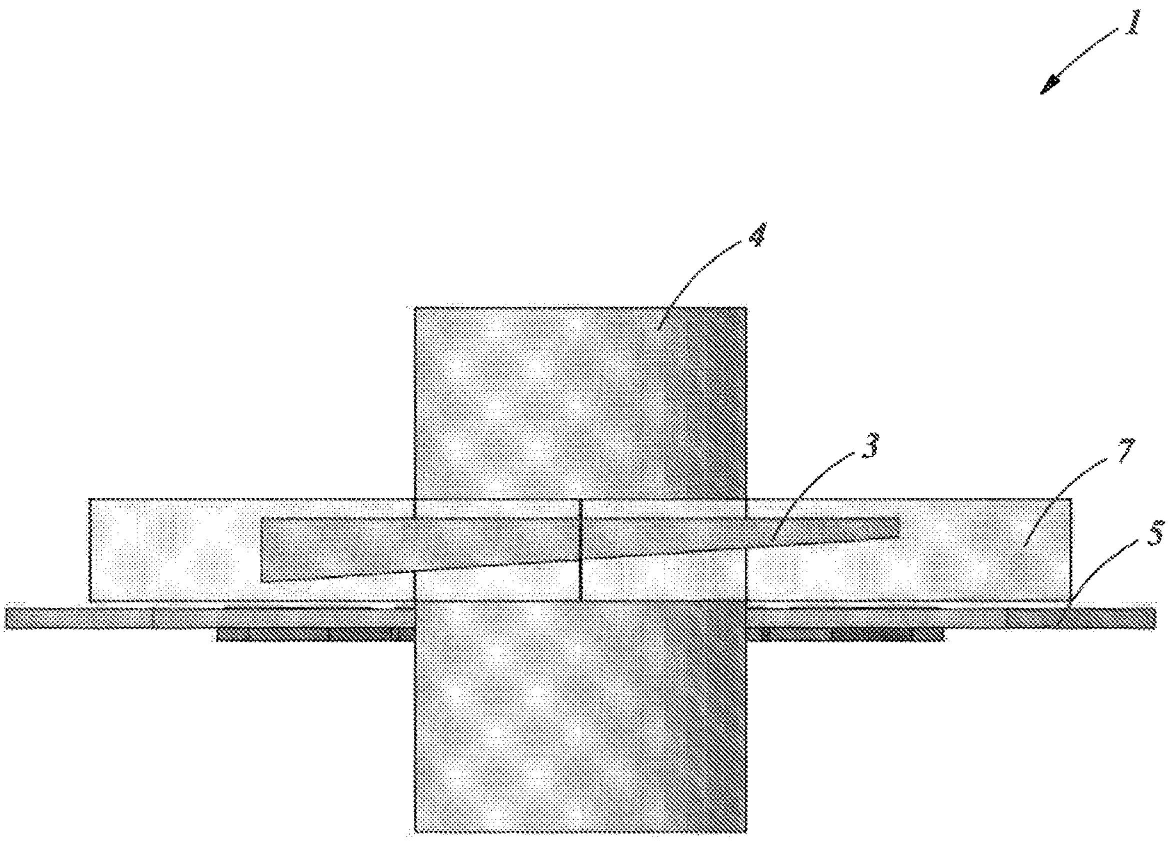
FIG. 4 shows a side view of the sensor of FIG. 3.

A second embodiment of the sensor 1 is shown in FIGS. 3 and 4.

In this embodiment, the ferrite ring 3 is split in two halves that are secured together to form a ring. The ferrite ring 3 has a sloped lower side surface. The ferrite ring 3 is mounted on a bobbin 7 with a radial offset. The bobbin 7 is split in two halves that are secured together to form a ring-shaped disk holding the ferrite ring.

Also, instead of three oscillators, six oscillators are secured to the PCB 5.

In use, the oscillators receive power from a battery, or any other suitable power supply. Each oscillator drives its associated field coil to form a local magnetic circuit with magnetic flux flowing via air gaps and ferrite ring as shown in FIG. 2.

Due to the ferrite ring being secured off-centre to the axis, the ferrite ring extends unevenly over the field coils. In a first position the ferrite ring extents over a major part of the field coils on the left-hand side of the PCB and over a mirror part of the field coils on the right-hand side of the PCB (see FIG. 1).

Each field coil produces a local magnetic motive force that causes magnetic flux to flow in a local magnetic circuit as shown in FIG. 2. Each magnetic path has specific variable reluctance, causing its field coil to have specific variable inductance which influences oscillation frequency of associated oscillator.

The 32 bit counters determine the number of pulses produced by each oscillator during a precise period of time. The microprocessor uses these count values to adjust a model of the system until best agreement between predicted counts and observed counts occurs, thus producing angular position of the ferrite ring, and consequently the axle.

The axis rotates in a given direction, rotating the ferrite ring in sympathy to a new position. The process described above to achieve the changes in the magnetic fields continues and the angular position of the rotating axis can thus be determined continuously, in real time. The process yields an absolute angle encoder, capable of real time operation at high speed and in both clockwise and anti-clockwise directions.

It is envisaged that the second embodiment herein described will be convenient to use. Compared to the prior art the system and method described herein is more accurate than the prior art in that it uses electromagnets instead of polarized permanent magnets. Also, multiple sensors are used in conjunction with a system model, allowing the algorithm to achieve very high accuracy and immunity to radial and axial misalignment of rotor and stator, temperature drift and long-term variation due to ageing.

It will be appreciated by those skilled in the art that many other embodiments of the invention including both rotary and linear position sensors are possible without departing from the scope of the invention. For example, the nominal oscillation frequency at which the oscillators drive their associated field coils does not need to be 5 MHz but can be lower or higher. It can be increased to 50 MHz to increase the resolution ten-fold or it can be reduced to lower EMI emissions. In similar fashion the bit count of binary counters in the micro-processor can be increased to improve resolution or decreased to lower component count.

The invention claimed is:

1. A sensor comprising a stationary magnetic field generator for generating a stationary magnetic field, and a moveable magnetically conductive part, moveable to influence the stationary magnetic field, a difference in influence being indicative of the position of the magnetically conductive part, wherein the stationary magnetic field generator is a field coil forming a variable inductor of a tank circuit of an independent oscillator; the moveable magnetically conductive part configured such that movement thereof varies the inductance of the field coil; and wherein the sensor determines the position of the moveable magnetically conductive part using a micro-processor to determine the number of pulses produced by the independent oscillator during a precise period of time.

2. The sensor as claimed in claim 1, wherein the moveable magnetically conductive part is associated with a first part of an object, the position of which is to be detected relative to a second part of the object.

3. The sensor as claimed in claim 2, wherein the first part is an axle.

4. The sensor as claimed in claim 3, wherein the moveable magnetically conductive part is located around a part of the axle.

5. The sensor as claimed in claim 4, wherein the moveable magnetically conductive part is a movable magnetically conductive ring located around the axle.

6. The sensor as claimed in claim 5, wherein the moveable magnetically conductive ring is off-center with the axle.

7. The sensor as claimed in claim 6, wherein the moveable magnetically conductive ring is sloped at a part of a surface thereof.

8. The sensor as claimed in claim 7, wherein the moveable magnetically conductive ring is irregular at a part of the surface thereof.

9. The sensor as claimed in claim 8, wherein the moveable magnetically conductive ring is sloped at a major side surface thereof.

10. The sensor as claimed in claim 9, wherein the moveable magnetically conductive ring is composed of ferrite.

11. The sensor as claimed in claim 10, wherein the field coil is spaced apart from at least one side of the movable magnetically conductive ring.

12. The sensor as claimed in claim 11, wherein a printed circuit board is located around at least part of the axle.

13. A sensing method comprising the steps of: creating a stationary magnetic field using a stationary magnetic field generator comprising a field coil, wherein the field coil forms a variable inductor of a tank circuit of an independent oscillator; moving a movable magnetically conductive part through the stationary magnetic field, movement of the movable magnetically conductive part influencing the stationary magnetic field; varying an inductance of the field coil by movement of the movable magnetically conductive part; and determining the position of the moveable magnetically conductive part by using a micro-processor to determine the number of pulses produced by the independent oscillator during a precise period of time.

14. The sensing method as claimed in claim 13, wherein the step of providing for the moveable magnetically conductive part to move with a first part of an object, the position of which is to be detected.

15. The sensing method as claimed in claim 14, which includes the step of providing for the moveable magnetically conductive part to rotate off-center around the first part.

* * * * *